US010420430B2

(12) United States Patent
Scott et al.

(10) Patent No.: US 10,420,430 B2
(45) Date of Patent: Sep. 24, 2019

(54) ADJUSTABLE MOUNT ASSEMBLY FOR MOUNTING DEVICES ON A CUBICLE/OFFICE PARTITION WALL

(71) Applicant: THE BOEING COMPANY, Chicago, IL (US)

(72) Inventors: Matthew Lee Scott, Charleston, SC (US); Dale William Stier, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/848,065

(22) Filed: Sep. 8, 2015

(65) Prior Publication Data
US 2017/0065106 A1 Mar. 9, 2017

(51) Int. Cl.
A47G 1/24 (2006.01)
A47G 1/16 (2006.01)

(52) U.S. Cl.
CPC .............. A47G 1/24 (2013.01); A47G 1/1653 (2013.01)

(58) Field of Classification Search
CPC .......... A47G 1/1653; A47G 1/24; B25B 1/02; B25B 5/02; F16B 2/12
USPC ........ 248/477, 480, 495, 496, 226.11, 228.1, 248/228.3, 228.5, 229.12, 229.14, 229.22, 248/229.24, 230.3, 230.5, 231.41, 231.61, 248/316.4
See application file for complete search history.

(56) References Cited

U.S. PATENT DOCUMENTS

| 2,783,367 | A | * | 2/1957 | Locke | ................. B60Q 1/2611 248/205.5 |
| 3,765,633 | A | * | 10/1973 | Caudill | .................... G10G 5/00 24/457 |
| 4,301,767 | A | * | 11/1981 | Willinger | ............. A01K 63/065 119/245 |
| 5,457,745 | A | * | 10/1995 | Wang | ................. B60R 11/0241 379/426 |
| 6,994,300 | B2 | * | 2/2006 | Labeirie | ................. B64C 1/406 248/65 |

(Continued)

OTHER PUBLICATIONS

Dictionary.com, Definition of Clamp, Retrieved Sep. 4, 2018, https://www.dictionary.com/browse/clamp?s=t. (Year: 2018).*

Primary Examiner — Jonathan Liu
Assistant Examiner — Guang H Guan
(74) Attorney, Agent, or Firm — Toler Law Group, PC

(57) ABSTRACT

An adjustable mount assembly for supporting a convex mirror or other devices on the top of a cubicle/office partition wall. In one embodiment, the adjustable mount assembly comprises a supporting element having a vertical tubular member configured to securely hold a connecting means, such as a Z-bracket for supporting a convex mirror, an adjustable element insertable into the supporting element, and two clamping elements that when inserted into vertical slots in each of the supporting element and the adjustable element, form a clamping assembly that holds the adjustable mount assembly snugly in place on top of the partition wall. The adjustable mount assembly is adjustable to snugly fit over the top of any partition wall to support a convex mirror or other devices by means of an interchangeable mount adapter and may also comprise release buttons on the adjustable element to facilitate disassembly of an assembled mount assembly.

15 Claims, 10 Drawing Sheets

(56) References Cited

U.S. PATENT DOCUMENTS

| | | | | |
|---|---|---|---|---|
| 7,191,990 B2* | 3/2007 | Hutter, III | ............... | B64C 1/406 248/228.3 |
| 7,243,449 B2* | 7/2007 | Wichmann | .............. | G09F 15/00 40/606.01 |
| 8,264,827 B2* | 9/2012 | Yuan | ..................... | F16B 5/0642 248/229.12 |
| 8,561,355 B2* | 10/2013 | Canavarro | ............ | E04B 2/7416 248/231.41 |
| 8,651,435 B2* | 2/2014 | Guthke | ..................... | F16L 3/24 248/228.3 |
| 8,853,543 B2* | 10/2014 | Liu | ...................... | H05K 7/1418 174/138 G |
| 2005/0045785 A1* | 3/2005 | Cohen | ................. | E04F 11/1812 248/214 |
| 2005/0284995 A1* | 12/2005 | Hutter, III | ............... | B64C 1/406 248/235 |
| 2009/0008521 A1* | 1/2009 | Lee | ..................... | F16M 11/041 248/226.11 |

* cited by examiner

ADJUSTABLE MOUNT ASSEMBLY FOR MOUNTING DEVICES ON A CUBICLE/OFFICE PARTITION WALL

BACKGROUND

1. Field

Various embodiments described herein are related to mounting assemblies and, more particularly, to an adjustable mount assembly for supporting a convex mirror or other device on top of a cubicle/office partition wall.

2. Related Art

In general, convex mirrors often found in the hallways of various buildings (including offices, hospitals, hotels, schools, stores, apartment buildings, and parking structures. Convex mirrors are useful for people accessing the hallways, especially at locations having blind spots or intersections where visibility may be limited. They are also used on roads, driveways, and alleys to provide safety for motorists where there is a lack of visibility, especially at curves and turns. Convex mirrors are also useful in providing store and office security, surveillance, and visitor detection in commercial buildings, hotels, schools, and hospitals.

Convex mirrors are usually mounted on a wall or ceiling, usually using a J-mount, where hallways intersect each other, or where they make sharp turns. Convex mirrors came in various sizes, e.g., 12", 18", 24", and 32", generally with a mirror face of 2 mm acrylic.

In an office or workplace setting, where employees' work areas are defined by cubicle/office partition walls, there may also blind spots or intersections where visibility may be limited. Therefore, there is a need for a means of attaching a convex mirror on top of a cubicle/office partition wall that is capable of being easily affixed to the top of a cubicle/office partition wall as well as being easily removable when changes are made in the workplace areas.

SUMMARY

Disclosed is an adjustable mount assembly for mounting devices, such as a convex mirror, on a cubicle/office partition wall. The adjustable mount assembly comprises four elements and may be installed on any size or style of cubicle/office partition wall without the use of any fasteners, tools or special equipment. The four elements are: a supporting element, an adjustable element, and two clamping elements, one inserted into a vertical slot of the supporting element and the other inserted into a vertical slot of the adjustable element. The supporting element comprises ratchet tracks in a vertical slot and in a horizontal slot, the adjustable element comprises a plurality of tabs or clicks that engage teeth of the ratchet tracks in the horizontal slot, and the adjustable clamping element comprises a plurality of tabs or clicks that engage teeth of the ratchet tracks in the vertical slot so that there is motion of an element in a slot in both directions but holding firm in the clamping direction.

The adjustable mount assembly may be assembled in place on the top of a cubicle/office partition wall by placing the supporting element on the top of the cubicle/office partition wall and then inserting the adjustable element into a horizontal slot of the supporting element and adjusting the two pieces to fit snugly over the top of the cubicle/office partition wall. The assembly is completed by inserting a clamping element into each of the vertical slots of the supporting element and the adjustable element, that are also adjusted to snugly affix the adjustable mount assembly on top of the cubicle/office partition wall by the engaging tabs engaging teeth of the ratchet tracks in the vertical slots.

The supporting element of the adjustable mount assembly may also comprise a vertical tubular member having a central slotted opening configured for receiving and retaining a connecting means that may be used for supporting a device on top of a cubicle/office partition wall. The vertical tubular member may be an interchangeable mount adapter configured to be removably inserted into a supporting receptacle of supporting element. Typically, the connecting means is a Z-bracket connected to a conventional 12" convex acrylic mirror that once mounted on the top of the cubicle/office partition wall may be used to "see" around corners, aisles, and partitions in corridors or hallways, i.e., any location where blind spots are present. A conventional 12" convex acrylic mirror provides a viewing distance of up to 16', which should be sufficient for the typical office work area without detracting from the esthetics of the office, i.e., larger, more cumbersome mirrors may detract from the appearance of the work area. For applications in other settings, larger convex acrylic mirrors could be used but this would entail heavier and more costly mirrors. With the interchangeable mount adapter, the supporting element is configurable to accept multiple additional mount adapters that accept and retain different connecting means configured to support various objects.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure.

DETAILED DESCRIPTION

Disclosed is an adjustable mount assembly configured for affixing devices, such as a convex mirror, to the top of a cubicle/office partition wall. In general, the adjustable mount assembly comprises a supporting element, an adjustable element, and two clamping elements, which may be assembled to fit snugly over the top of a cubicle/office partition wall.

Figure 1:
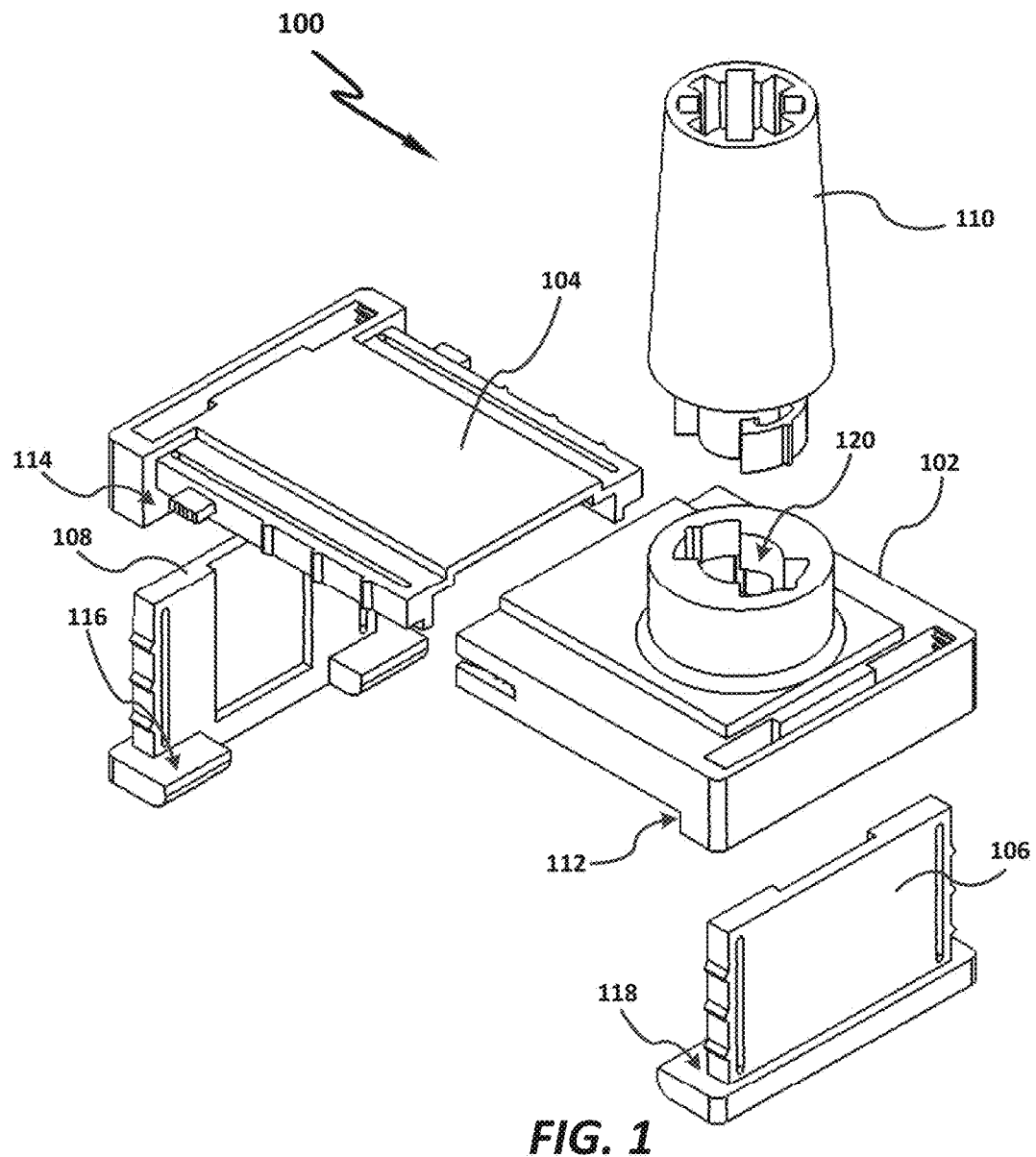
FIG. 1 is a top perspective exploded view of an example of an adjustable mount assembly in accordance with the present disclosure.

In FIG. 1, a top perspective exploded view of an example of an adjustable mount assembly 100 in accordance with the present disclosure is shown. The adjustable mount assembly 100 comprises a supporting element 102, an adjustable element 104, and two clamping elements 106 and 108, which are shown in greater detail in FIGS. 4A, 4B, 4C, and 4D, 5A, 5B. 5C, and 5D, and 6A, 6B, and 6C, respectively. Also shown is an interchangeable mount adapter 110 configured to be removably inserted into supporting receptacle 120 of supporting element 102.

Figure 2:
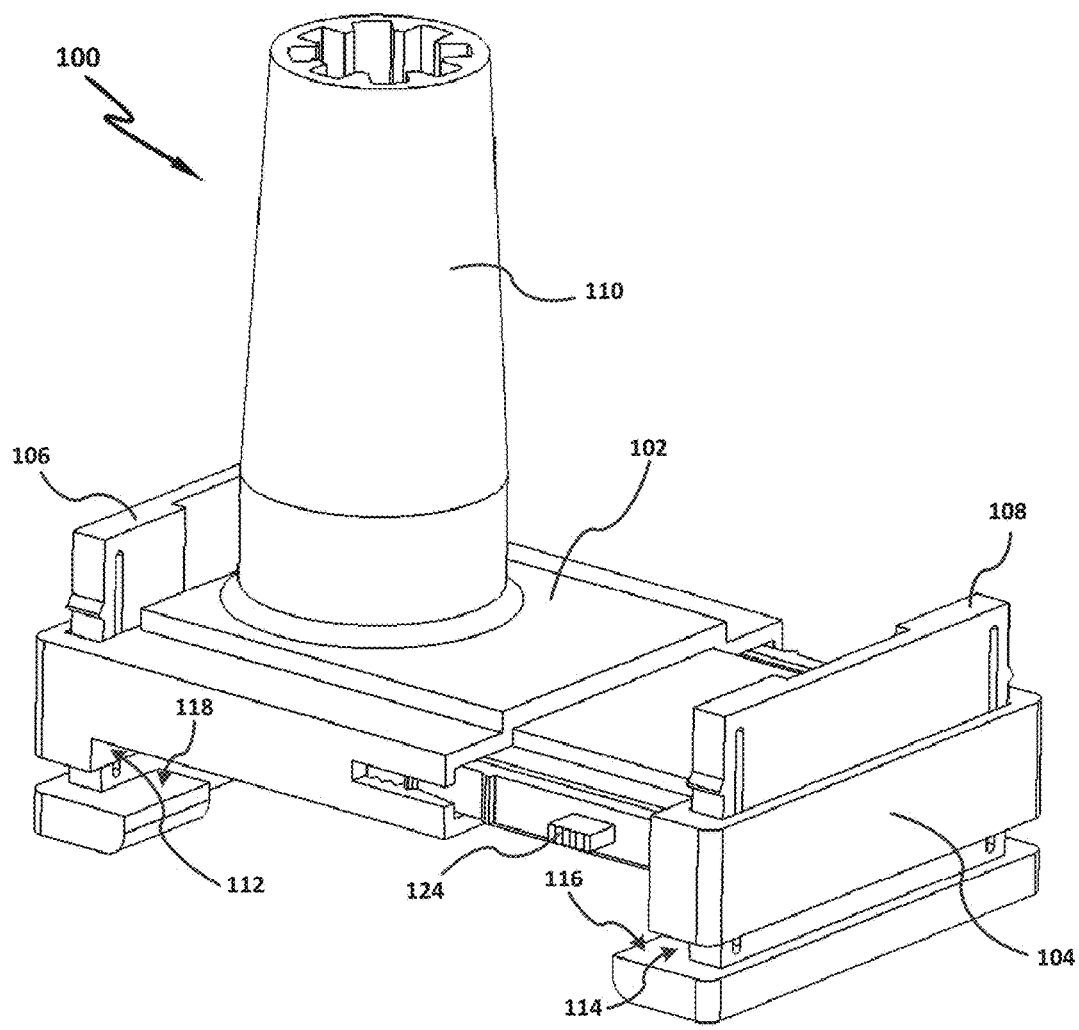
FIG. 2 is a top perspective view of the adjustable mount assembly shown in FIG. 1 in an assembled configuration.
Figure 3:
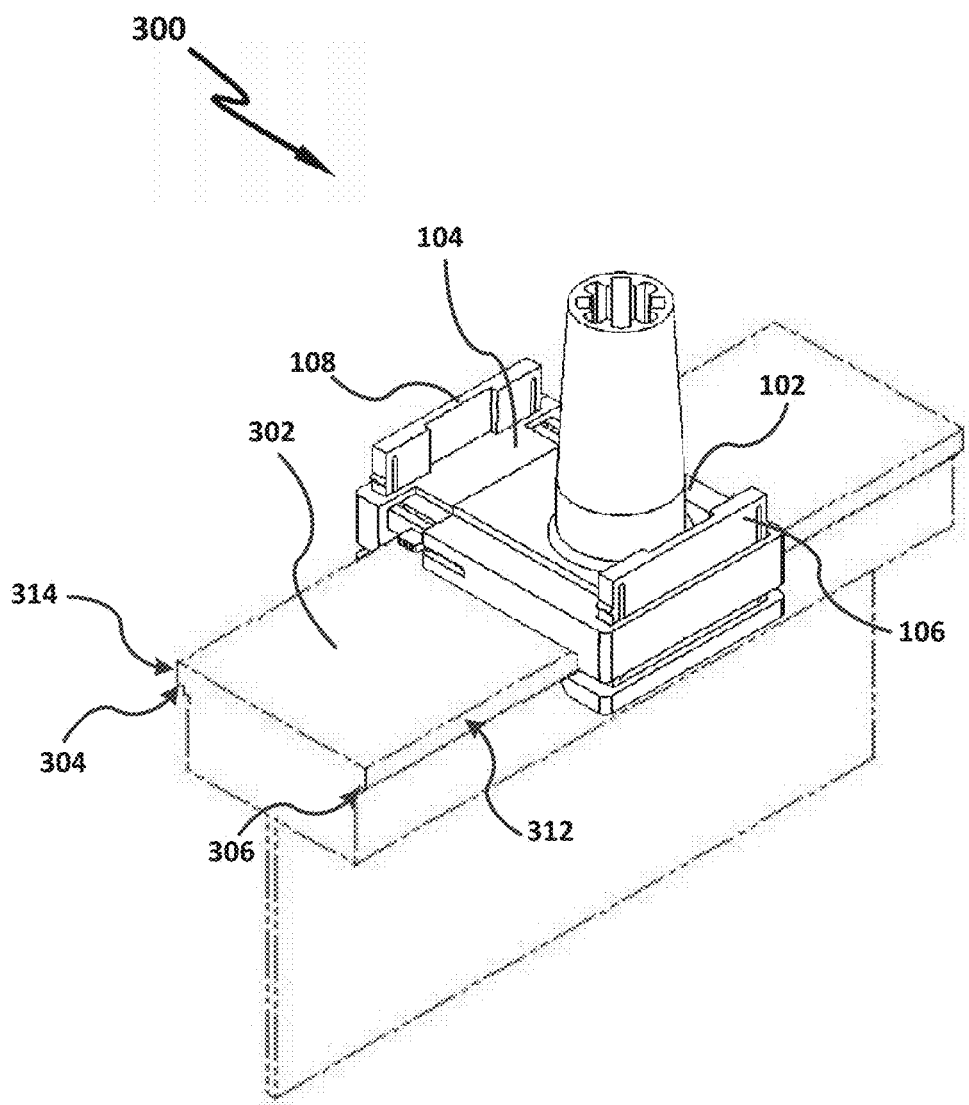
FIG. 3 is a top perspective view of the adjustable mount assembly shown in FIG. 1 in an assembled configuration mounted on top of a cubicle/office partition wall.

Turning to FIG. 2, a top perspective view of the mount assembly shown in FIG. 1 is shown in an assembled configuration. In FIG. 2, supporting element 102 is shown with the adjustable element 104 slidably inserted into a horizontal slot of the supporting element 102. Interchangeable mount adapter 110 is shown inserted into the supporting receptacle (not shown) of supporting element 102. Supporting element 102 may include a length-wise notch 112 and adjustable element 104 may also include a length-wise notch 114, where each of the notches 112 and 114 may be adjustably fitted over the top of a cubicle/office partition wall as shown in FIG. 3. Adjustable element 104 may also include release button 124, which is further described below with respect to FIG. 5B.

Figure 10:
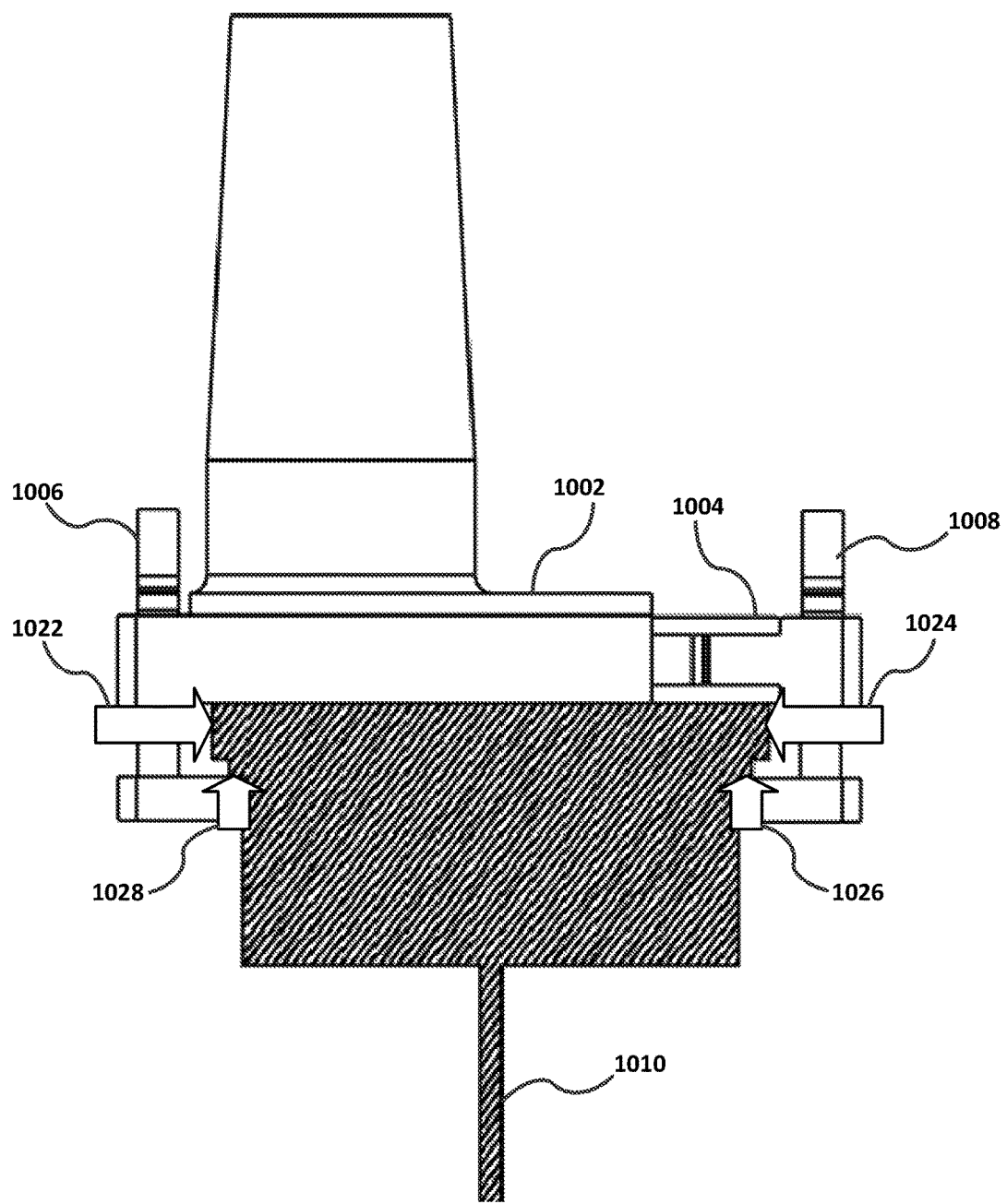
FIG. 10 is a section view of an adjustable mount assembly in accordance with the present disclosure in an assembled configuration affixed on top of a cubicle/office partition wall.

Clamping elements 106 and 108 may be slidably inserted into vertical slots in supporting element 102 and adjustable element 104, respectively. Clamping elements 106 and 108 may also have clamp pads 118 and 116, respectively, which clamp pads are configured to fit under ridges on a top of a cubicle/office partition wall as shown in FIGS. 3 and 10, and assist in affixing the adjustable mount assembly 100 to the cubicle/office partition wall together with notches 112 and 114.

FIG. 3 is a top perspective view 300 of the adjustable mount assembly shown in FIG. 1 in an assembled configuration mounted on top of a cubicle/office partition wall 302. A cubicle/office partition wall 302 typically includes a pair of lips or rims 312 and 314 running along its entire length, one on each side of the cubicle/office partition wall 302, and as shown in FIG. 3, the notch 112 of the supporting element 102 and the notch 114 of the adjustable element 104 shown in FIG. 2 may be adjustably fitted over the top of cubicle/office partition wall 302 and be fitted snugly against rims 312 and 314, respectively, of the cubicle/office partition wall 302.

As also shown in FIG. 3, the assembled mount assembly is also held in place on top of cubicle/office partition wall 302 by the clamp pads 118 and 116 of clamping elements 108 and 106, respectively, that each fit under notches 306 and 304, respectively, of the cubicle/office partition wall 302.

FIGS. 4A, 4B, 4C, and 4D are various views of the supporting element of the adjustable mount assembly shown in FIG. 1, and include certain dimensions of a preferred embodiment of an assembled mount assembly in accordance with the present disclosure. It is appreciated by those of ordinary skill in the art that these dimensions may vary as required in other embodiments designed for cubicle/office partition walls of varying widths.

Figures 4A, 4B:
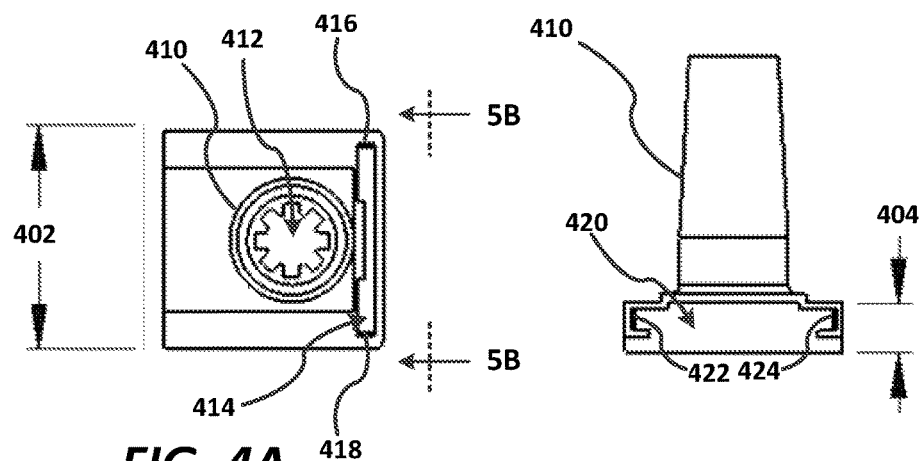
FIGS. 4A, 4B, 4C, and 4D are top plan, open-end side elevation, closed-end side elevation and bottom plan views, respectively, of the supporting element of the adjustable mount assembly shown in FIG. 1.

FIG. 4A is a top plan view of the supporting element 102 of the adjustable mount assembly shown in FIG. 1, where dimension 402 is a width of 3.00". Also shown is a slotted central opening 412 formed within interchangeable mount adapter 410 that is removably inserted into a supporting receptacle (not shown) of supporting element 102. The slotted central opening 412 may be configured for receiving and retaining a connecting means, such as a Z-bracket for supporting a convex mirror on a cubicle/office partition wall. It is appreciated by those skilled in the art that the slotted central opening 412 of the interchangeable mount adapter 110 may vary to accommodate other forms of connecting means, and that these connecting means may be used to suspend other devices on a cubicle/office partition wall, such as whiteboards, calendars, artwork, etc., as well as cameras, monitors, loudspeakers, etc.

Figure 6A:
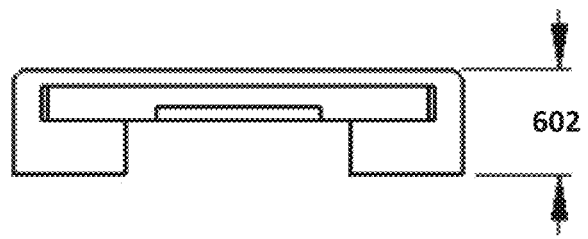
FIGS. 6A, 6B, and 6C are top plan, inner side elevation, and bottom plan views, respectively, of the adjustable clamping element of the adjustable mount assembly shown in FIG. 1.
Figure 6B:
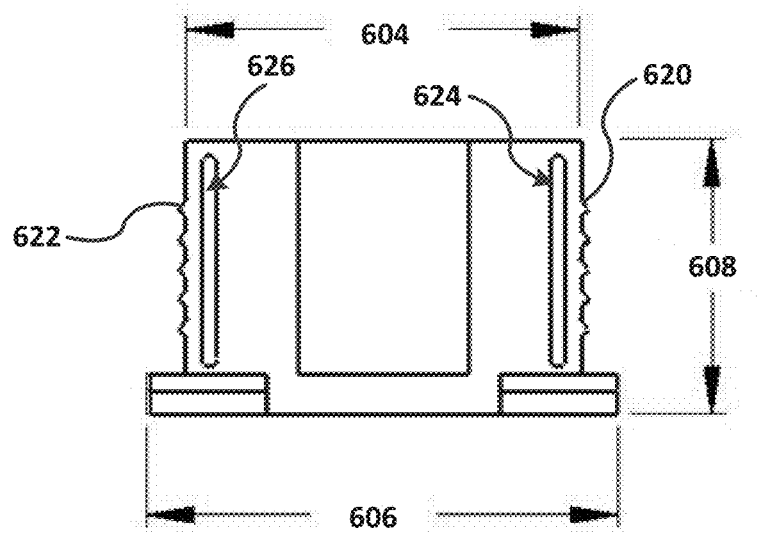
Figure 6C:
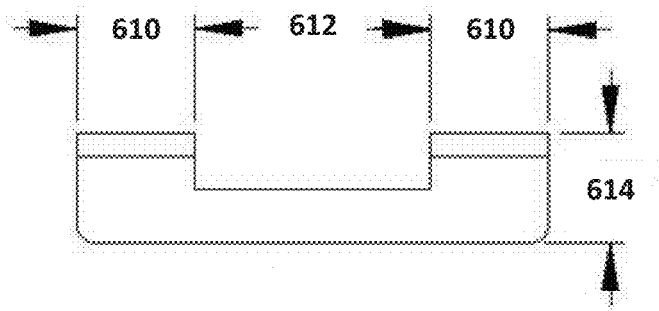

Also shown in FIG. 4A is a vertical slot 414, into which the adjustable clamping element shown in FIGS. 6A, 6B, and 6C may be removably inserted. Formed along the inside of the vertical slot 414 along its height are two ratchet tracks 416 and 418, which include teeth that are engaged by the engaging tabs 620 and 622, respectively, of the adjustable clamping element shown in FIG. 6C.

FIG. 4B is an open-end side view of the supporting element 102, where dimension 404 is a height of the base of 0.65". This dimension is related to dimension 508 of FIG. 5E, which is width of the channel formed in the adjustable element 104, which is inserted into the slot 420 shown in FIG. 4B. Interchangeable mount adapter 410 is a vertical tubular member containing the central slotted opening 412 shown in FIG. 4A. Horizontal slot 420 is a slot into which the adjustable element shown in FIGS. 5A-5E may be removably inserted. Ratchet tracks 422 and 424 are formed on opposite sides of horizontal slot 420.

Figures 4C, 4D:
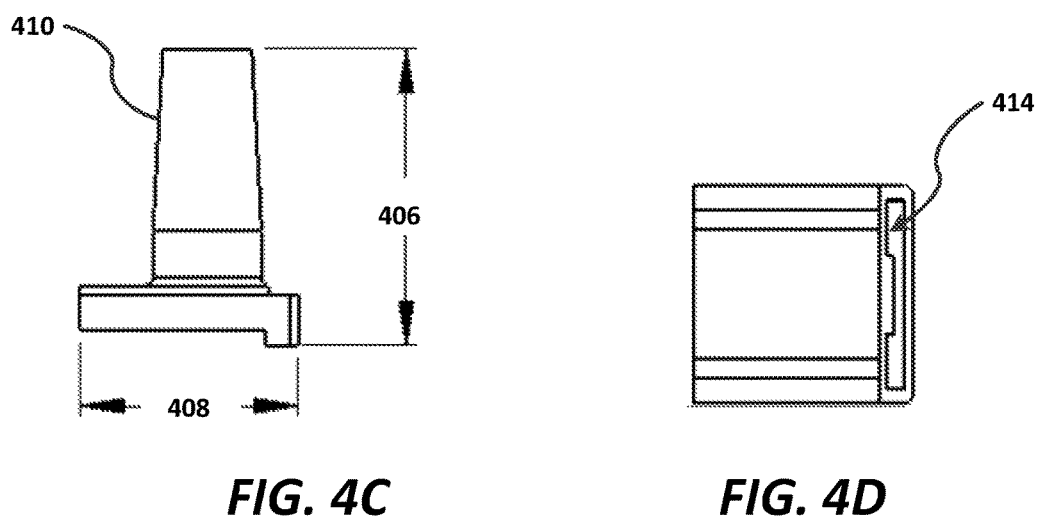

Turning to FIG. 4C, a closed-end side elevation view of the supporting element 102 is shown, where dimensions 406 and 408 are a height and a length of 3.28" and 3.00", respectively. FIG. 4D is a bottom plan view of the supporting element 102, where vertical slot 414 is a slot in the supporting element 102 configured to receive the clamping element shown in FIGS. 6A, 6B, and 6C, whereupon the teeth of the two ratchet tracks 416 and 418 shown in FIG. 4A are engaged by the engaging tabs 620 and 622, respectively, shown in FIG. 6C.

Figure 5A:
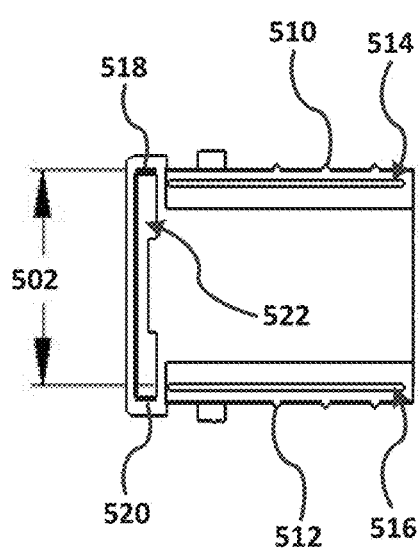
FIGS. 5A, 5B, 5C, 5D, and 5E are top plan, bottom plan, closed-end side elevation, front side elevation, and open-end side elevation views, respectively, of the adjustable element of the adjustable mount assembly shown in FIG. 1.

FIG. 5A is a top plan view of the adjustable element 104 of the adjustable mount assembly shown in FIG. 1, where dimension 502 is a width of 2.77". Also shown in FIG. 5A is a vertical slot 522, into which the clamping element shown in FIGS. 6A, 6B, and 6C may be removably inserted. Formed along the inside of the vertical slot 522 are two ratchet tracks 518 and 520, whose teeth are engaged by the engaging tabs 620 and 622, respectively, of the clamping element shown in FIG. 6B. Engaging tabs 510 and 512 are formed on opposite sides of the adjustable element 104, which when the adjustable element 104 is inserted into slot 420 of the supporting element 102, engage ratchet tracks 416 and 418, respectively, of the supporting element 102. Slots 514 and 516 are slots in the adjustable element 104 that provide flexibility to the engaging tabs 510 and 512 formed on opposite sides of the adjustable element 104 when they engage ratchet tracks 416 and 418, respectively.

Figure 5B:
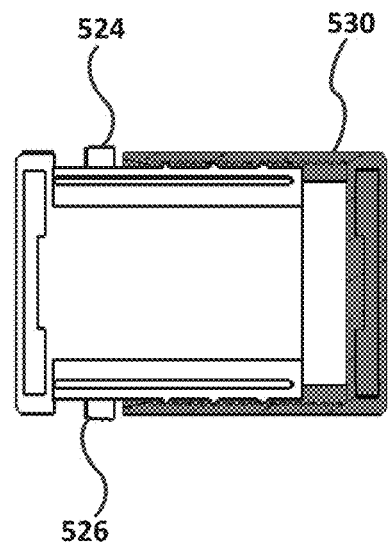

FIG. 5B is a bottom plan view of the adjustable element 104, comprising release buttons 524 and 526 that are formed on the side rails of the adjustable element 104 and when depressed, assist in disassembling the adjustable mount assembly by depressing the engaging tabs 510 and 512 from the ratchet tracks 422 and 424, respectively, of the supporting member. Also shown in FIG. 5B, is a section view 530 of the supporting element shown in FIG. 4A, which illustrates the engagement of the engaging tabs 510 and 512 of the adjustable element with the teeth of the ratchet tracks 422 and 424, respectively, of the supporting member.

Figure 5C:
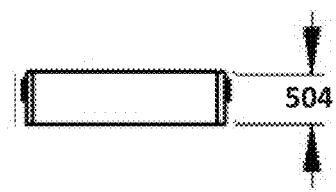
Figure 5D:
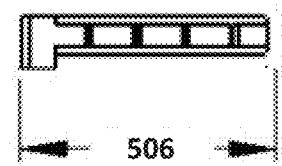
Figure 5E:
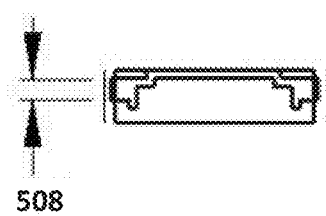

FIG. 5C is a closed-end side elevation view of the adjustable element 104, where dimension 504 is a thickness of 0.64", and FIG. 5D is an open-end side elevation view of the adjustable element 104, where dimension 506 is a length of 3.30". FIG. 5E is a side elevation view of the adjustable element 104, where dimension 508 is a width of the channel formed in the side of 0.27".

FIGS. 6A, 6B, and 6C are top plan, inner side elevation, and bottom plan views, respectively, of the clamping elements 106 and 108 of the adjustable mount assembly shown in FIG. 1. In the top view of FIG. 6A, the dimension 602 is shown, which is a thickness of 0.70". In FIG. 6B, which is an inner side elevation view, an upper width 604 of 2.51" is shown, a length 608 of 1.75" is shown, and a lower width 606 of 3.00" is shown. Engaging tabs 620 and 622 (similar to the engaging tabs 510 and 512 of FIG. 5A) are formed along the length 608 of clamping elements 106 and 108, where these engaging tabs are designed with spaces between the tabs (or teeth) of the engaging tabs 620 and 622 such that the engaging tabs flex in and out when engaged with a ratchet track, thus allowing the clamping elements 106 and 108 to move in both directions when inserted in their respective vertical slots and the engaging tabs to mesh with the ratchet tracks for optimized holding power.

Assisting the flexing of engaging tabs 620 and 622 are slots 624 and 626 which are vertical slots formed in the clamping elements 106 and 108 of FIGS. 1-3 that provide flexibility to the engaging tabs when they engage ratchet tracks. Turning to FIG. 6C, a bottom view of the clamping elements 106 and 108 is shown, where dimension 614 is a thickness of 0.70". Dimension 612 is the width of 1.50" of an inner channel that conforms to the interior widths of vertical slots 414 of FIG. 4A and 520 of FIG. 5B, and dimensions 610 are widths of 0.75" that conform to pads 116 and 118 of FIG. 2.

Each of the elements of the adjustable mount assembly may be made of acrylonitrile butadiene styrene (ABS), polymethyl methacrylate (PMMA), polystyrene, combinations of the foregoing, and various other thermoplastics and resins, and the like.

Figure 7:
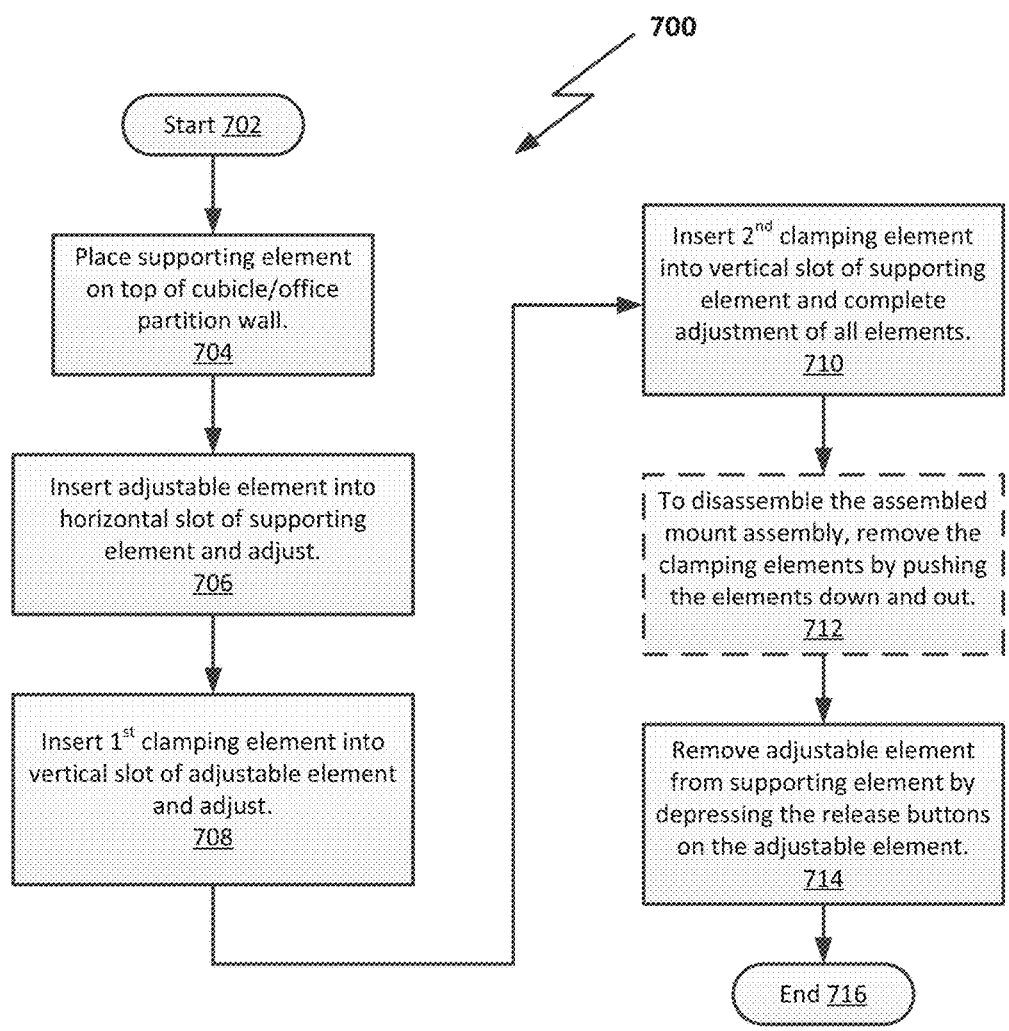
FIG. 7 is a flow diagram of an example of a method of assembling and disassembling an adjustable mount assembly in accordance with the present disclosure.

Turning to FIG. 7, a flow diagram 700 of an example of a method of assembling and disassembling an adjustable mount assembly in accordance with the present disclosure is shown. The method starts in step 702 and in step 704, a supporting element is placed on top of a cubicle/office partition wall. In step 706, an adjustable element is inserted into the horizontal slot of the support element, and the two elements are adjusted until they fit snugly on top of the cubicle/office partition wall.

A clamping element is inserted into the vertical slot of the adjustable element and the adjustable mount assembly is further adjusted in step 708. Next, another clamping element is inserted into the vertical slot of the supporting element in step 710, and the adjustable mount assembly is completed by making final adjustments of all elements.

To disassemble an assembled adjustable mount assembly, in step 712 the clamping elements may be removed from their respective vertical slots by applying downward pressure on the clamping elements to force them out of the assembled adjustable mount assembly. Step 712 is optional, and the assembled adjustable mount assembly may be disassembled by proceeding directly to step 714, where by depressing the release buttons on the adjustable element, the assembled adjustable mount assembly may be easily and quickly disassembled. The method then ends in step 716.

Figure 8:
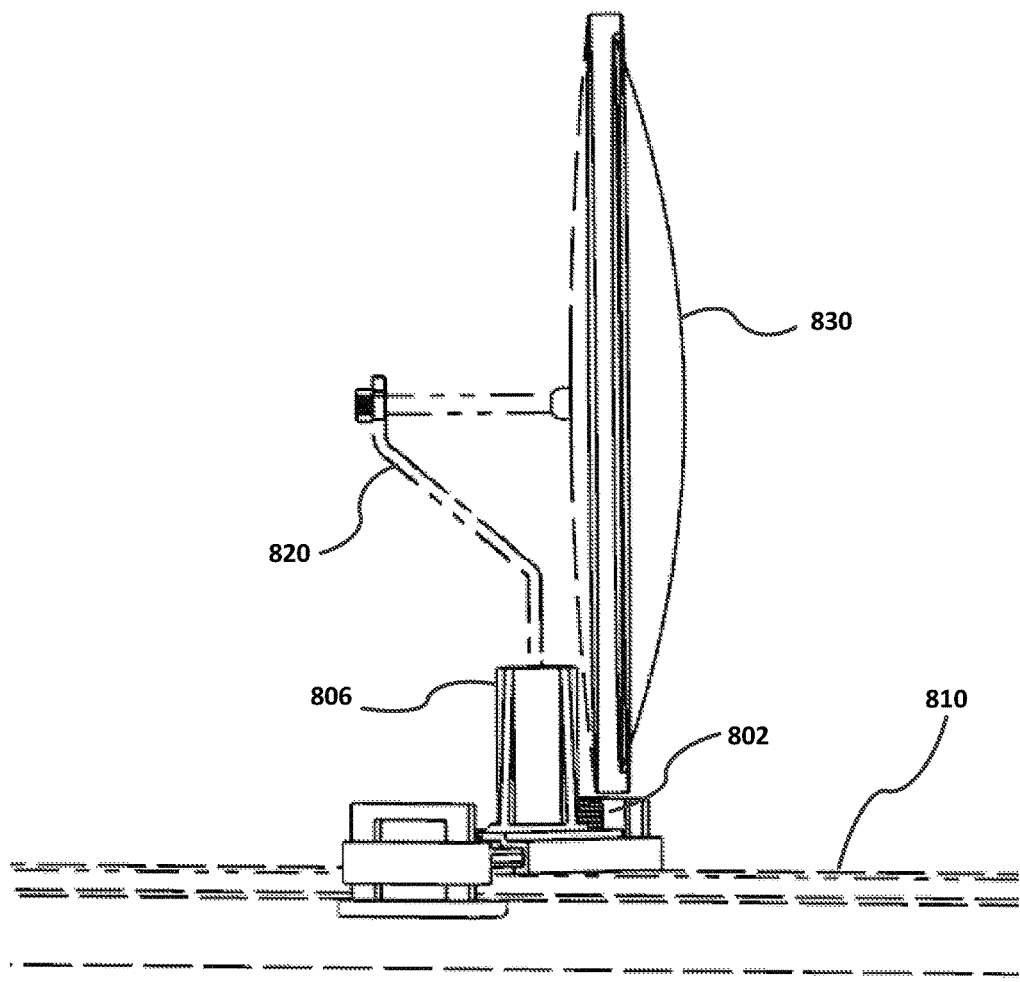
FIG. 8 is a side elevation view of an example of an implementation of an adjustable mount assembly shown in accordance with the present disclosure mounted on top of a cubicle/office partition wall, with a convex mirror supported by the adjustable mount assembly.

FIG. 8 is a side view of an example of an implementation of an adjustable mount assembly shown in accordance with the present disclosure mounted on top of a cubicle/office partition wall, with a convex mirror supported by the adjustable mount assembly. In FIG. 8, an adjustable mount assembly in an assembled configuration 802 is shown snugly mounted on top of a cubicle/office partition wall 810. A Z-bracket 820 is shown inserted into a slotted central opening (not shown) of a vertical tubular member 806. Connected to the Z-bracket 820 is convex mirror 830.

Figure 9:
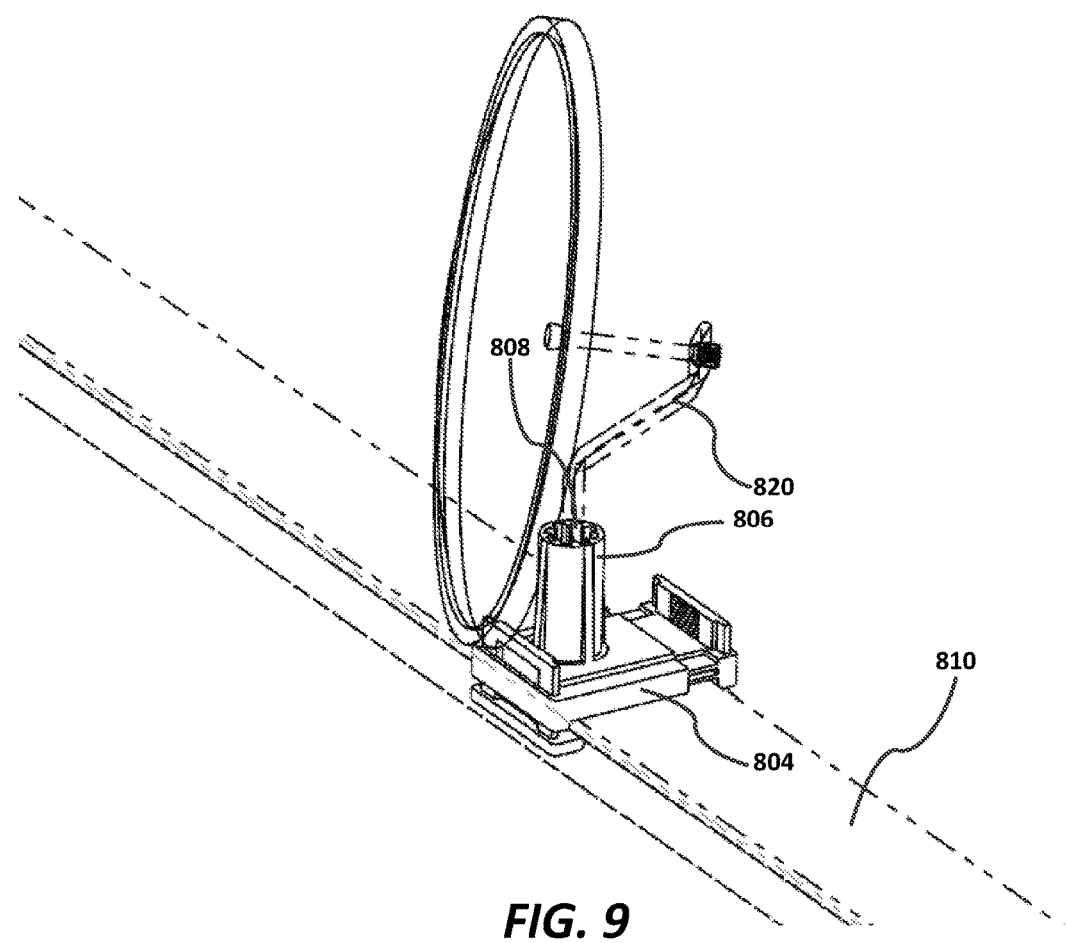
FIG. 9 is a side perspective view of the adjustable mount assembly supporting a convex mirror shown in FIG. 7.

FIG. 9 is a side perspective view of the adjustable mount assembly supporting a convex mirror shown in FIG. 8. FIG. 9 shows the Z-bracket 820 inserted into a slotted central opening 808 of the vertical tubular member 806 of supporting member 804 of the adjustable mount assembly is shown snugly mounted on top of a cubicle/office partition wall 810.

FIG. 10 is a section side view of an adjustable mount assembly in accordance with the present disclosure in an assembled configuration affixed on top of a cubicle/office partition wall. In assembling the adjustable mount assembly on a on top of a cubicle/office partition wall 1010, the process may begin by placing the supporting element 1002 on top of the cubicle/office partition wall 1010, and then inserting the adjustable element 1004 into the horizontal slot (not shown) of the supporting element 1002 and adjusting the adjustable element 1004 until the two elements fit snugly on top of the cubicle/office partition wall 1010. The tension provided by the supporting element 1002 and the adjustable element 1004 are represented by arrow 1022 and arrow 1024, respectively, where arrow 1022 is a schematic representation of pressure applied by notch 112, FIG. 2, of the supporting element 1002 on rim 312, FIG. 3, of the cubicle/office partition wall 1010, and arrow 1024 is a schematic representation of pressure applied by notch 114, FIG. 2, of the adjusting element 1004 on rim 314, FIG. 3, of the cubicle/office partition wall 1010.

In the next step, clamping element 1008 is inserted into the vertical slot (not shown) of the adjustable element 1004 and adjusted upward until clamp pad 116, FIG. 2, fits snugly against notch 304, FIG. 3, of the cubicle/office partition wall 1010, where arrow 1026 is a schematic representation of the pressure applied by clamp pad 116, FIG. 2, on notch 304, FIG. 3, of the cubicle/office partition wall 1010.

In the final step, clamping element 1006 is inserted into the vertical slot (not shown) of the supporting element 1002 and adjusted upward until clamp pad 118, FIG. 2, fits snugly against notch 306, FIG. 3, of the cubicle/office partition wall 1010, where arrow 1028 is a schematic representation of the pressure applied by clamp pad 118, FIG. 2, on notch 304, FIG. 3, of the cubicle/office partition wall 1010.

In FIG. 10 (and also FIG. 3), the cubicle/office partition wall 1010 is shown with an essentially flat top on which an adjustable mount assembly is firmly affixed. An adjustable mount assembly in accordance with the present disclosure may also be firmly affixed to a cubicle/office partition wall having a slightly domed cap or a slightly convex top just as well. In this instance, there will be three pressure points exerted on the top of the cubicle/office partition wall by the assembled adjustable mount assembly: the first being the supporting element with the adjusting element inserted, and two others being the clamp pads of the two clamping elements. With three pressure points, the assembled adjustable mount assembly will be stable and will remain firmly affixed to any such cubicle/office partition wall. Additionally, an adjustable mount assembly, in particular, the supporting element and the adjustable element, may, if necessary, be manufactured out of a thermoplastic having greater flexibility.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. An apparatus configured for attachment to a cubicle/office partition wall, the apparatus comprising:
   a supporting element comprising a base plate, a first track, a second track, a first support plate, and a second support plate, the first track and the second track disposed substantially parallel to each other at opposite sides of the base plate, the first support plate disposed substantially perpendicular to the first track, the first track extending between the base plate and the first support plate, the second support plate disposed substantially perpendicular to the second track, the second track extending between the base plate and the second support plate;
   an adjustable element configured for engagement with the supporting element, the adjustable element comprising a mounting plate, a first side rail, and a second side rail, the first side rail and the second side rail disposed substantially parallel to each other at opposite sides of the mounting plate, wherein the first track of the supporting element is configured to support and adjustably engage the first side rail of the adjustable element and the second track of the supporting element is configured to support and adjustably engage the second side rail of the adjustable element;
   a first release button disposed on a side portion of the first side rail and a second release button disposed on a side portion of the second side rail;
   a first clamping element disposed through a first slot of the supporting element, the first clamping element configured to be slidably and adjustably movable in the first slot of the supporting element in a direction substantially perpendicular to the base plate of the supporting element; and
   a second clamping element disposed through a first slot of the adjustable element, the second clamping element configured to be slidably and adjustably movable in the first slot of the adjustable element in a direction substantially perpendicular to the mounting plate of the adjustable element.

2. The apparatus of claim 1, further comprising a tubular member having a central slotted opening.

3. The apparatus of claim 2, wherein the supporting element further comprises a receptacle configured to receive a plurality of interchangeable mount adapters.

4. The apparatus of claim 2, further comprising a Z-bracket coupled to the tubular member.

5. The apparatus of claim 2, further comprising a mirror configured to be coupled to the tubular member via a connecting means.

6. The apparatus of claim 1, further comprising a first plurality of teeth formed on a side portion of the first track of the supporting element and a second plurality of teeth formed on a side portion of the second track of the supporting element.

7. The apparatus of claim 6, further comprising a first plurality of engaging tabs formed on the side portion of the first side rail of the adjustable element and a second plurality of engaging tabs formed on the side portion of the second side rail of the adjustable element, the first plurality of engaging tabs configured to engage the first plurality of teeth and the second plurality of engaging tabs configured to engage the second plurality of teeth when the adjustable element is inserted into the supporting element.

8. The apparatus of claim 1, wherein the first clamping element comprises a first set of engaging tabs and a second set of engaging tabs, wherein the supporting element includes a first set of teeth disposed within the first slot of the supporting element and a second set of teeth disposed within the first slot of the supporting element, wherein the first set of engaging tabs of the first clamping element are configured to engage the first set of teeth of the supporting element and the second set of engaging tabs of the first clamping element are configured to engage the second set of teeth of the supporting element when the first clamping element is inserted into the first slot of the supporting element, wherein the second clamping element comprises a first set of engaging tabs and a second set of engaging tabs, wherein the adjustable element includes a first set of teeth disposed within the first slot of the adjustable element and a second set of teeth disposed within the first slot of the adjustable element, and wherein the first set of engaging tabs of the second clamping element are configured to engage the first set of teeth of the adjustable element and the second set of engaging tabs of the second clamping element are configured to engage the second set of teeth of the adjustable element when the second clamping element is inserted into the first slot of the adjustable element.

9. The apparatus of claim 8, wherein the first clamping element comprises a first slot, wherein a longitudinal side of an opening of the first slot of the first clamping element is oriented substantially perpendicular to a longitudinal side of an opening of the first slot of the supporting element, wherein the second clamping element comprises a first slot, and wherein a longitudinal side of an opening of the first slot of the second clamping element is oriented substantially perpendicular to a longitudinal side of an opening of the first slot of the adjustable element.

10. The apparatus of claim 8, wherein the first clamping element includes a first slot and a second slot, wherein a longitudinal side of an opening of the first slot of the first clamping element is oriented substantially perpendicular to a longitudinal side of an opening of the first slot of the supporting element, wherein a longitudinal side of an opening of the second slot of the first clamping element is oriented substantially perpendicular to the longitudinal side of the opening of the first slot of the supporting element, wherein the second clamping element includes a first slot and a second slot, wherein a longitudinal side of an opening of the first slot of the second clamping element is oriented substantially perpendicular to a longitudinal side of an opening of the first slot of the adjustable element, and wherein a longitudinal side of an opening of the second slot of the second clamping element is oriented substantially perpendicular to the longitudinal side of the opening of the first slot of the adjustable element.

11. The apparatus of claim 1, wherein the adjustable element further comprises a second slot and a third slot, wherein a longitudinal side of an opening of the second slot of the adjustable element is oriented substantially perpendicular to a longitudinal side of an opening of the first slot of the adjustable element, and wherein a longitudinal side of an opening of the third slot of the adjustable element is oriented substantially perpendicular to the longitudinal side of the opening of the first slot of the adjustable element.

12. A method comprising:
   obtaining a kit configured for attachment to a cubicle/office partition wall, wherein the kit comprises:
   a supporting element comprising a base plate, a first track, a second track, a first support plate, and a second support plate, the first track and the second track disposed substantially parallel to each other at opposite sides of the base plate, the first support plate disposed substantially perpendicular to the first track, the first track extending between the base plate and the first support plate, the second support plate disposed substantially perpendicular to the second track, the second track extending between the base plate and the second support plate;
   an adjustable element configured for engagement with the supporting element, the adjustable element comprising a mounting plate, a first side rail, and a second side rail, the first side rail and the second side rail disposed substantially parallel to each other at opposite sides of the mounting plate, wherein the first track of the supporting element is configured to support and adjustably engage the first side rail of the adjustable element and the second track of the supporting element is configured to support and adjustably engage the second side rail of the adjustable element;
   a first release button disposed on a side portion of the first side rail and a second release button disposed on a side portion of the second side rail;
   a first clamping element configured to be disposed through a first slot of the supporting element, the first clamping element configured to be slidably and adjustably movable in the first slot of the supporting element in a direction substantially perpendicular to the base plate of the supporting element; and
   a second clamping element configured to be disposed through a first slot of the adjustable element, the second clamping element configured to be slidably and adjustably movable in the first slot of the adjustable element in a direction substantially perpendicular to the mounting plate of the adjustable element;
   placing the supporting element on a top of the cubicle/office partition wall;
   inserting the adjustable element into the supporting element;
   adjusting the adjustable element until the supporting element and the adjustable element are affixed to the top of the cubicle/office partition wall;
   inserting the first clamping member into the first slot of the supporting element and adjusting the first clamping member within the first slot of the supporting element; and
   inserting the second clamping member into the first slot of the adjustable element and adjusting the second clamping member within the first slot of the adjustable element.

13. The method of claim 12, further comprising the step of inserting a connecting means into a central slotted opening of a vertical tubular member of the supporting element, wherein the connecting means is configured to support a device on the top of the cubicle/office partition wall.

14. The method of claim 13, where the connecting means comprises a Z-bracket configured to support a convex acrylic mirror on the top of the cubicle/office partition wall.

15. The method of claim 13, further comprising the step of depressing the first and second release buttons and removing the adjustable element from the supporting element.

* * * * *